UNITED STATES PATENT OFFICE.

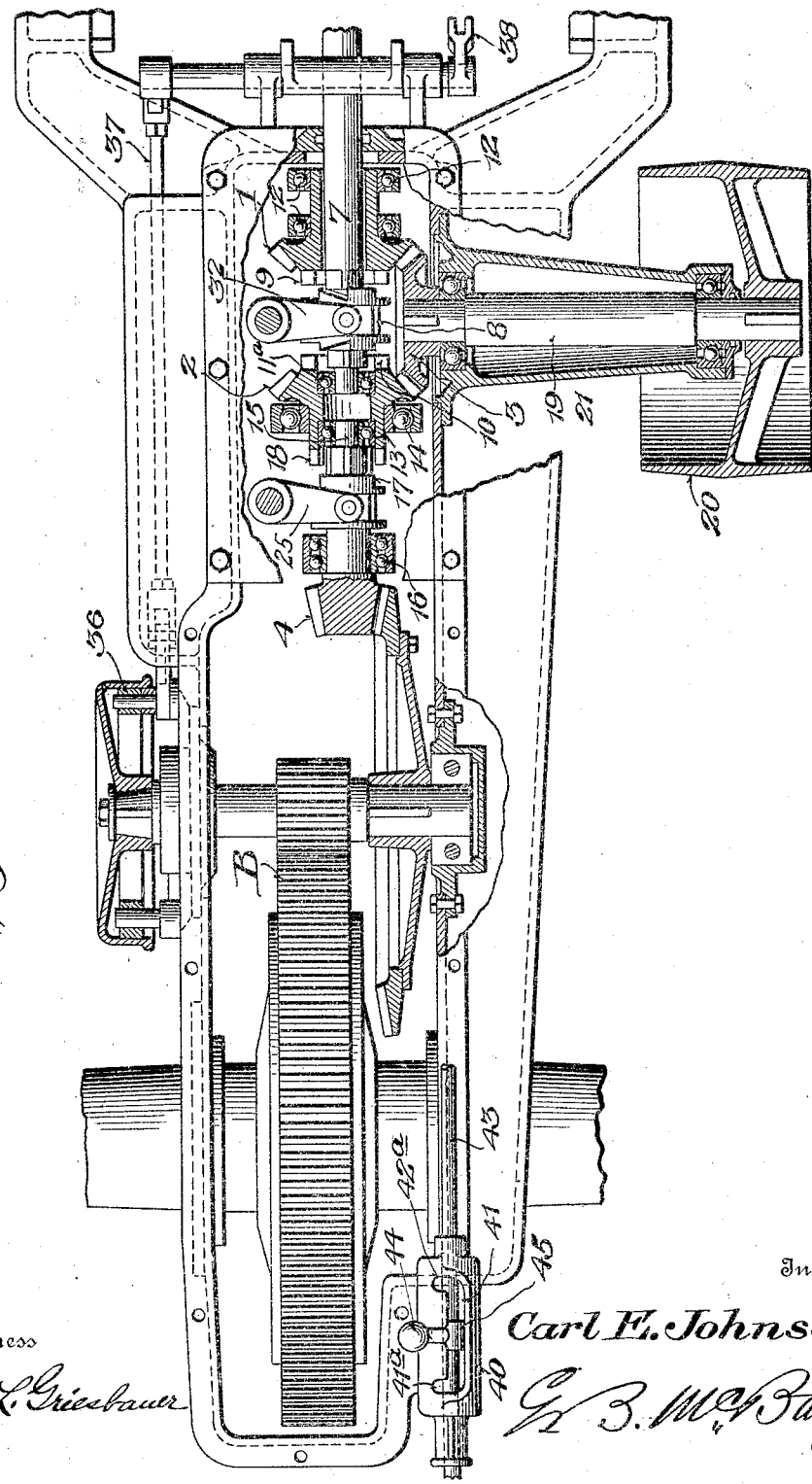

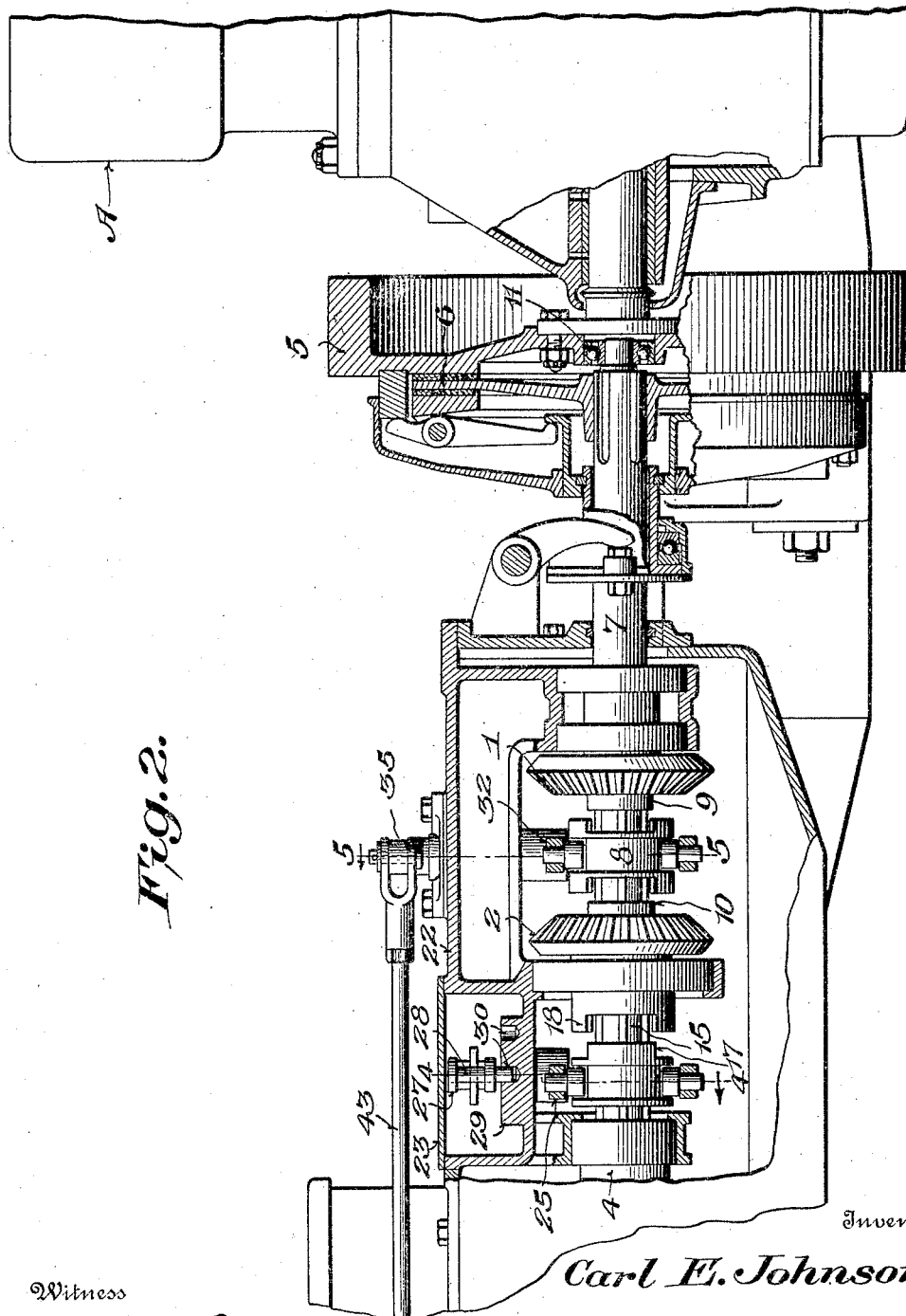

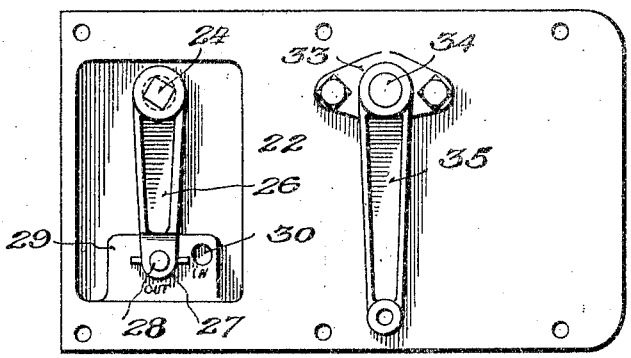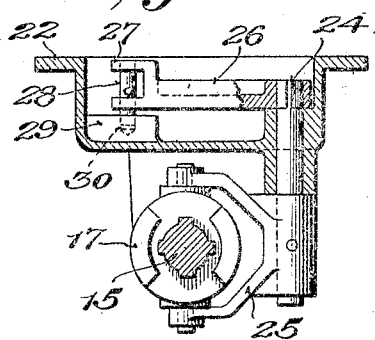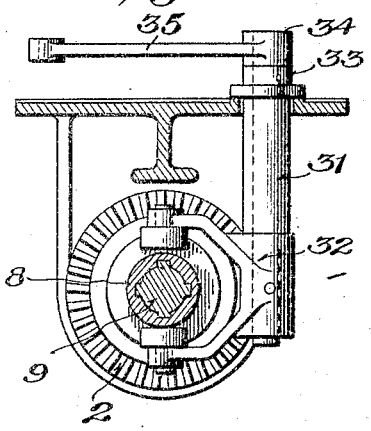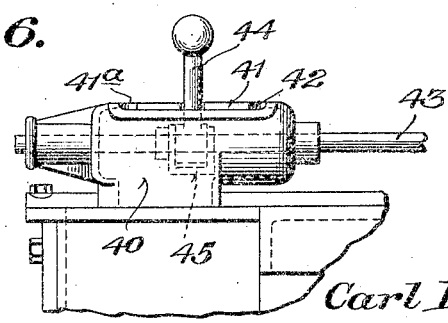

CARL E. JOHNSON, OF ST. PAUL, MINNESOTA.

TRANSMISSION MECHANISM.

1,363,044.  Specification of Letters Patent.  Patented Dec. 21, 1920.

Application filed October 17, 1918. Serial No. 258,615.

*To all whom it may concern:*

Be it known that I, CARL E. JOHNSON, a citizen of the United States, residing at St. Paul, in the county of Ramsey and the State of Minnesota, have invented certain new and useful Improvements in Transmission Mechanism, of which the following is a specification.

This invention relates to the transmission mechanism of a tractor with which is combined a power plant adapted for use in the operation of various forms of farm machinery of a stationary nature; the invention also includes the clutch mechanism by means of which the power from the engine is transmitted to the final drive, and the same given either forward or reverse motion, together with means for shifting the said clutches, all of these features being included in the term "transmission mechanism."

The invention also consists in the novel features hereinafter described, pointed out in the claims and shown in the accompanying drawings, in which:—

Figure 1 is a sectional plan view.

Fig. 2 is a side elevation, parts being broken away.

Fig. 3 is a plan view of certain clutch shifting levers, a cover plate being removed.

Fig. 4 is a section on the line 4—4 of Fig. 2.

Fig. 5 is a section on the line 5—5 of Fig. 2.

Fig. 6 is a detail side elevation of a clutch shifting device.

In the drawings I have shown my traction frame on which is mounted a suitable engine A and a final drive B, either of which may be of any desired type, adapted for the work to be performed. Between these two mentioned parts are located the transmission devices forming the subject of this invention and which consists in a reverse gear 1, a direct drive gear 2, a connecting gear 3, and a final drive pinion 4 and their correlated parts to be described in detail.

A fly wheel 5 has a friction drive or clutch 6 and in the hub of the clutch 6 is mounted a splined clutch shaft 7. On this shaft and between the gears 1 and 2 is a forward and reverse clutch 8. This is a double faced jaw clutch keyed to the shaft 7 and slidable thereon.

The opposing faces of the gears 1 and 2, which are of the bevel type, are provided with suitable jaws, 9 and 10 to coöperate with the jaws of the reverse clutch.

The floating clutch shaft 7 is mounted at one end on ball bearings 11 arranged in the fly wheel hub, and at the opposite end in ball bearings 11$^a$ in the gear 2.

The gear 1 is provided with a long sleeve mounted in ball bearings 12.

Within the gear 2 are placed ball bearings 13 and said gear is mounted on bearings 14, the latter lying between the bearings 11$^a$ and 13, but of course outside of the gear.

A final drive shaft 15 carries at its rear end the final drive pinion 4. At its forward end this shaft has reduced portions and works in the ball bearing 13 of the gear 2 and adjacent the pinion 4 it has an enlarged portion mounted in double ball bearings 16, said shaft being in alinement with the shaft 7.

Splined on the shaft 15 between the gear 2 and the drive pinion 4, which meshes with a gear of the driving mechanism B, is a traction clutch 17. Jaws 18 on the gear 2 are adapted to co-act with said clutch.

The gear 3 which meshes with gears 1 and 2 is carried by the inner end of a pulley shaft 19, which at its outer end carries a pulley 20, the shaft 19 being mounted in ball bearings and inclosed in a housing 21 secured to the side of the tractor frame.

To operate the clutches the following described devices are employed:

A casting 22 provided with a removable cover plate 23 is fitted in the frame above the traction clutch 17. It carries a downwardly extending shaft 24 to the lower end of which is fixed a shifting yoke 25. To the upper end is secured a lever 26 having at its free end a fork, arranged perpendicularly, 27. A pin 28 has limited vertical movement in the fork. A pin block 29 is cast in the casting 22 and has recesses 30 adapted to receive the pin 28 and lock the lever 26, and consequently the clutch 17, in its two positions "in" and "out." In the drawing it is shown in "out" position.

For the double clutch 8 with its three positions, neutral, direct and reverse, I provide a depending sleeve 31, yoke shifter 32, collar 33, and a hub 34 carrying a lever 35, operated as hereafter described.

An internally expanding brake 36 is also employed, and brake rod 37 connected to the clutch shaft 7, the usual foot or hand lever, not shown, being connected at the links 38.

A gear shift quadrant 40 is arranged conveniently for the operator, consisting of a tubular member slotted as at 41, with three notches 41$^a$, 42 and 42$^a$, corresponding to the three positions of the double clutch member 8. An operating rod 43 works in the tubular member 40 and is pivotally connected to the free end of the clutch shifting lever 35. A lever 44 is swingingly mounted on the rod and works through and in the slot 41, being connected to the rod 43 by a yoke connection 45, so that as the lever is lifted and swung from one notch to another longitudinal movement is given the rod, and corresponding swinging movement to the lever 35, with proper movement of the clutch 8 from neutral to direct or reverse drive, or vice versa.

When power is being supplied to exterior machinery through the pulley the tractor should remain stationary.

Therefore clutch 17 is disengaged by lifting the pin 28 and shifting lever 26 to "out" position. Then if the clutch 8 is thrown into engagement with gear 1 the pulley will be driven in one direction and if thrown into engagement with gear 2, it will be driven in the opposite direction as said gears are on opposite sides of gear 3.

For traction work the clutch 17 is thrown into engagement with the gear 2, and the double jaw clutch 8 into engagement with the same gear, this giving a direct forward drive through pinion 4. At this time gears 2 and 3 rotate as idle gears, gear 1 revolving in the direction opposite to the rotation of the clutch shaft, and it will be noted that the hub of said gear does not come into frictional contact with said shaft. By sliding clutch 8 into engagement with gear 1, power is transmitted to gear 2 through gear 3 reversing direction of rotation of said gear 2.

The mechanism for shifting said clutches has already been described in detail. It will be noted that on direct drive a minimum number of gears are employed, and I secure direct and reverse drive and also pulley drive by the use of only three gears for this part of the mechanism.

It will be noted that the brake 36 is operated in conjunction with the clutch, so that it is impossible to apply the brake without releasing the engine clutch.

What I claim is:—

1. In a device of the kind described, an engine shaft, a fly wheel thereon, a beveled gear wheel mounted in exterior bearings, a clutch shaft having one end mounted in the fly wheel and the other end mounted in said gear, a second opposing gear loose on said shaft, a third gear meshing with the two first mentioned gears, a final drive shaft loosely mounted in the first mentioned beveled gear, clutch jaws carried by both faces of said gear, a coöperating clutch on the final drive shaft, a double clutch on the clutch shaft between the first and second mentioned gears and adapted to engage either of them, and a pulley shaft carried by the third mentioned gear.

2. In a tractor, a floating clutch shaft loosely mounted at one end in a beveled gear having clutch faces on its opposing faces, the opposite end of said clutch shaft being driven from an engine shaft, a gear loosely mounted and through which the clutch shaft passes, said gear having clutch jaws on the face opposite the first mentioned gear, a double clutch keyed to the shaft between the two gears, means for shifting said clutch, a third gear meshing with the two first mentioned gears, a shaft mounted loosely in the first mentioned gear, a clutch thereon, means for shifting said clutch into engagement with said gear, and a final drive gear on said shaft.

3. The combination in a tractor of an engine shaft and final drive mechanism, of a floating clutch shaft interposed between the two, an externally mounted gear through which the clutch shaft passes, a second externally mounted gear in which an end of the clutch shaft is mounted, a final drive shaft also mounted in said gear, said gears having clutch faces, a clutch on the final drive shaft, a double clutch on the clutch shaft between the two gears, and keyed to the shaft, a third gear meshing with the two gears mentioned, and means for shifting the clutches.

4. The combination in a tractor with a clutch shaft, a beveled gear having a clutch face on one side through which the shaft loosely passes, a second beveled gear having double clutch faces in which an end of the shaft is mounted, a double clutch slidably mounted on the shaft between the two gears, means for operating the said clutch, said clutch having a neutral position from which it can be shifted to engage either of the aforementioned gears, a third gear meshing with the two other gears, a final drive shaft having an end mounted in the second mentioned gear, a clutch on said shaft, and means for throwing said clutch into engagement with said second mentioned gear.

5. In a tractor, the combination with a clutch shaft and a final drive shaft in alinement with each other, an exteriorly mounted gear having opposite clutch faces and forming a bearing for said shafts, a beveled gear loosely mounted on the clutch shaft, a double clutch between the gears, a third gear meshing with the two first mentioned gears, a clutch on the final drive shaft, a clutch lever operatively connected to the double clutch, a gear shift quadrant placed within reach of the operator and comprising a slotted and notched tube, a swinging lever adapted to rest in the notches and travel along the slot, a rod slidable in the tube and pivotally connected to the clutch lever, and means connecting the swinging lever to said rod.

In testimony whereof I have affixed my signature.

CARL E. JOHNSON.